3,460,629
LAWN CARE APPARATUS
Earl P. Shapland, Jr., Fisher, Ill., and John R. West, Marysville, Ohio; said West assignor to The O. M. Scott & Sons Company, Marysville, Ohio, a corporation of Ohio
Filed Mar. 29, 1965, Ser. No. 443,563
Int. Cl. A01b 33/00, 39/06
U.S. Cl. 172—42
18 Claims

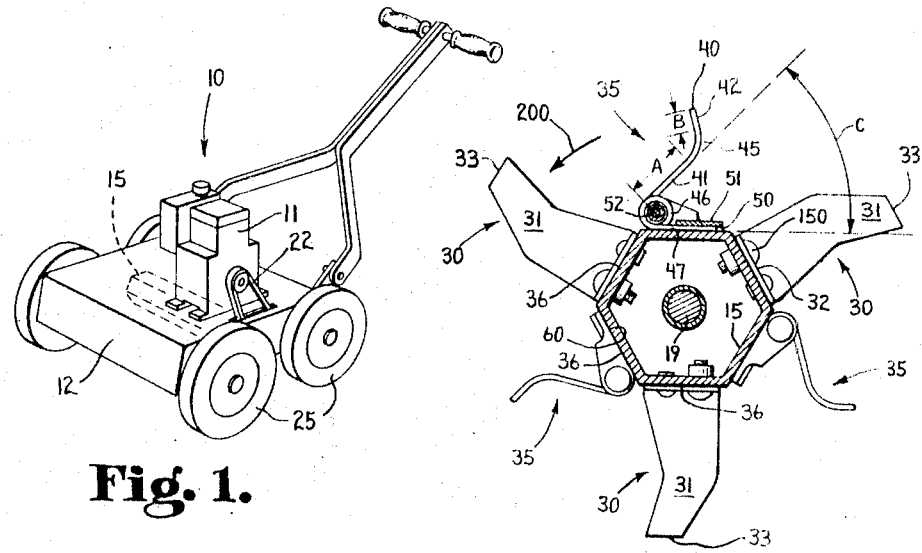
Fig. 1.
Fig. 2.
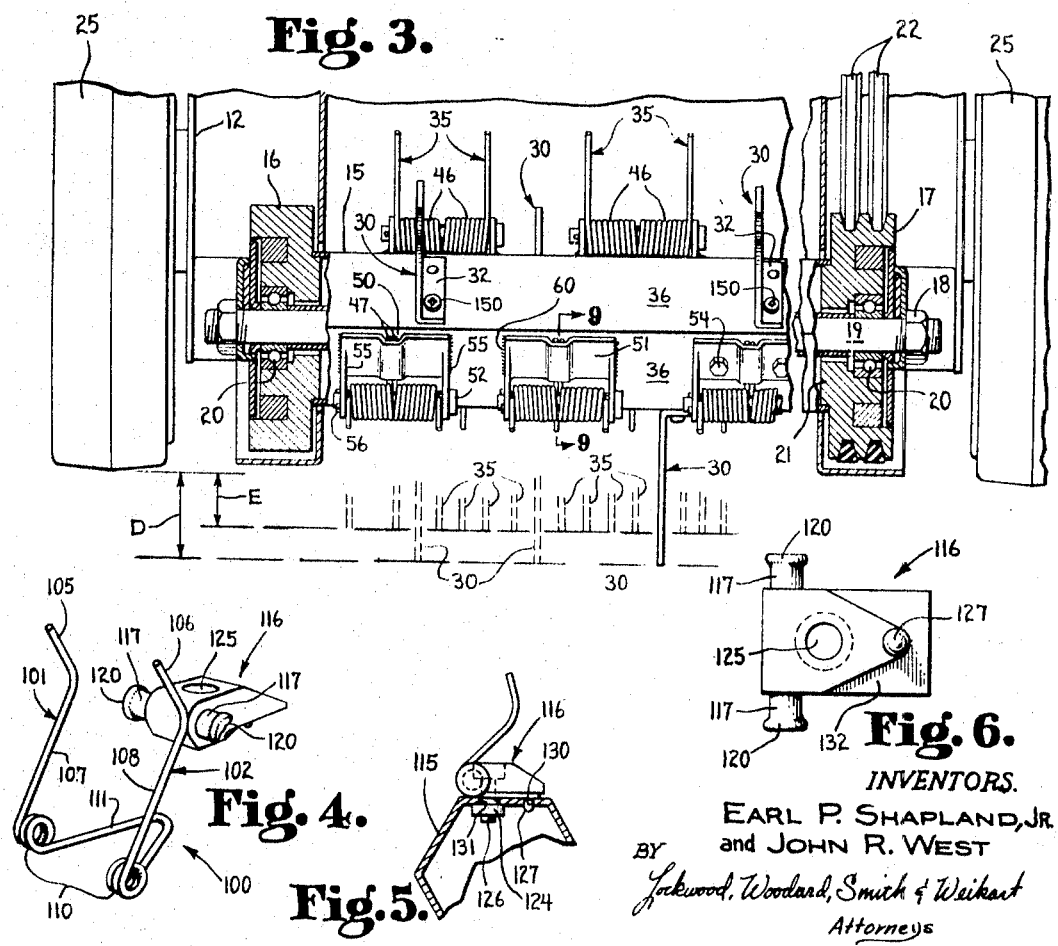
Fig. 3.
Fig. 4.
Fig. 5.
Fig. 6.
INVENTORS.
EARL P. SHAPLAND, JR.
and JOHN R. WEST
BY Lockwood, Woodard, Smith & Weikart
Attorneys INVENTORS.
EARL P. SHAPLAND, JR.
and JOHN R. WEST

United States Patent Office 3,460,629
Patented Aug. 12, 1969

ABSTRACT OF THE DISCLOSURE

Lawn care apparatus including a tube of hexagonal cross section mounted on a wheeled vehicle for powered rotation with the axis of the tube in parallel relation to the ground. On the external flat surfaces of the tube are mounted ground scarifying and thatch cutting blades at relatively widely spaced intervals and raking spring tines at more closely spaced intervals.

---

The present invention relates to lawn care apparatus and more particularly to apparatus for cultivating and raking a lawn.

Various devices have been conceived in the past for cutting, cultivating and raking a lawn. These devices have not always proved to be completely satisfactory for a number of reasons. For example, the conventional rotary or shear type lawn mower leaves clippings on the lawn which tend to form a mat or thatch interfering with the growth of grass rhizome and new blades by preventing water, light and air from getting to the grass crown or root zone. Also the natural horizontal growth of some grass varieties and weeds has the same effect of preventing light and air from getting to the crown of desirable grasses. No presently available apparatus is capable of satisfactorily cutting through and removing such undesirable thatch and matted vining growth without doing substantial damage to existing desirable grasses in the lawn.

Consequently, a primary object of the present invention is to provide lawn care apparatus incorporating improved means for aerating, cultivating and raking a lawn.

Another object of this invention is to provide improved lawn care apparatus.

A further object of the present invention is to provide lawn care apparatus capable of removing dead grass blades, clippings and other organic debris from a lawn area without noticeable damage to established grasses.

Still another object of the invention is to provide lawn care apparatus capable of slicing through a mat of live or dead vegetative growth.

Still a further object of the present invention is to provide lawn care apparatus arranged to form grooves or slices in the soil surface to provide a lodging place for seed.

Still another object of the present invention is to provide a lawn care apparatus designed to permit quick, fast and economical blade and tine replacement.

One specific embodiment of the present invention might include a support element having an axis, means for mounting said support element for rotation about its axis with its axis in parallel relation to the ground, power means for rotating said support element, a plurality of blades each mounted on said support element, spring tines mounted on said support element and formed of wire, said spring tines extending generally radially of said axis and curving at their distal ends toward said direction of rotation.

The full nature of the invention will be understood from the accompanying drawings and the following description and claims.

FIG. 1 is a perspective view of lawn care apparatus embodying the present invention.

FIG. 2 is a vertical section taken through the machine of FIG. 1 but showing only the operating portion of the apparatus.

FIG. 3 is a vertical longitudinal section through the apparatus of FIG. 1 and taken primarily through the axis of the apparatus.

FIG. 4 is an exploded perspective view of an alternative embodiment of the present invention.

FIG. 5 is a fragmentary section similar to FIG. 2 of the embodiment of FIG. 4.

FIG. 6 is a bottom plan view of a portion of the structure illustrated in FIGS. 4 and 5.

Figure 7:
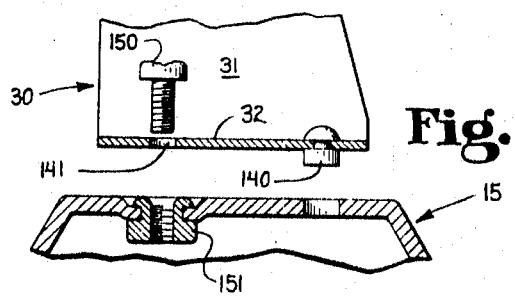
FIG. 7 is an enlarged exploded fragmentary section similar to FIG. 2 but taken directly through the blade mounting means thereof.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is illustrated a lawn care apparatus 10 having a conventional motor 11 mounted on the frame 12 thereof for rotating the tube 15. The motor 11 can also be arranged, if desired to provide self-propulsion to the apparatus 10. As shown in FIG. 3, the tube 15 is mounted for rotation about its axis with its axis in parallel relation to the ground. Thus, the adapters 16 and 17, the bearings 20, shaft 19 and nuts 18 mount the tube 15 on the frame 12 for rotation about the axis of the tube. The adapter 17 has an externally cylindrical portion 21 which projects into the tube and is welded thereto for driving the tube and rotating it about its axis. The belts 22 couple the engine 11 to the tube for rotation thereof.

Preferably, suitable means (not shown) may be provided for adjusting the distance of the tube 15 from the ground as determined by the positions of the wheels 25. This means might, for example, comprise the conventional plurality of apertures found in relatively inexpensive rotary lawn mowers or may involve a more expensive lever arrangement for vertically raising and lowering the wheels relative to the frame 12. One specific arrangement for this purpose forms a part of Model 18T, manufactured by Henderson Manufacturing Company of Fisher, Illinois. Of course, other such means for adjusting the distance of the tube from the ground could be used.

Referring to FIGS. 2 and 7, there is illustrated blades 30, each of which has a vertically extending cutting portion 31 and a horizontally extending flange 32 used for mounting the respective blade on the tube. As suggested in FIG. 2, the distal ends 33 of the blades 30 travel in the same arc which is located so that the blades move into the ground approximately one-eighth of an inch. Of course, this distance will vary depending upon the thickness of turf and adjustment of the lawn care apparatus and in some cases the blades will not touch the ground. The blades 30 function to cut into the ground and to provide grooves or slices to act as a lodging place for grass seed. Closely spaced blades can pull and tear desirable grasses. Consequently, the blades 30 are provided only at relatively widely spaced intervals along the length of the tube 15 as illustrated in FIG. 3 which, at the lower portion thereof, shows the path of the blades 30 as well as the path of spring tines 35.

As is best shown in perhaps FIG. 2, the tube 15 has a cross section which is internally and externally hexagonal. Thus on the external surface of the tube 15 there are provided six flat elongate mounting surfaces or platforms 36 extending parallel to the axis of the tube 15.

Figure 8:
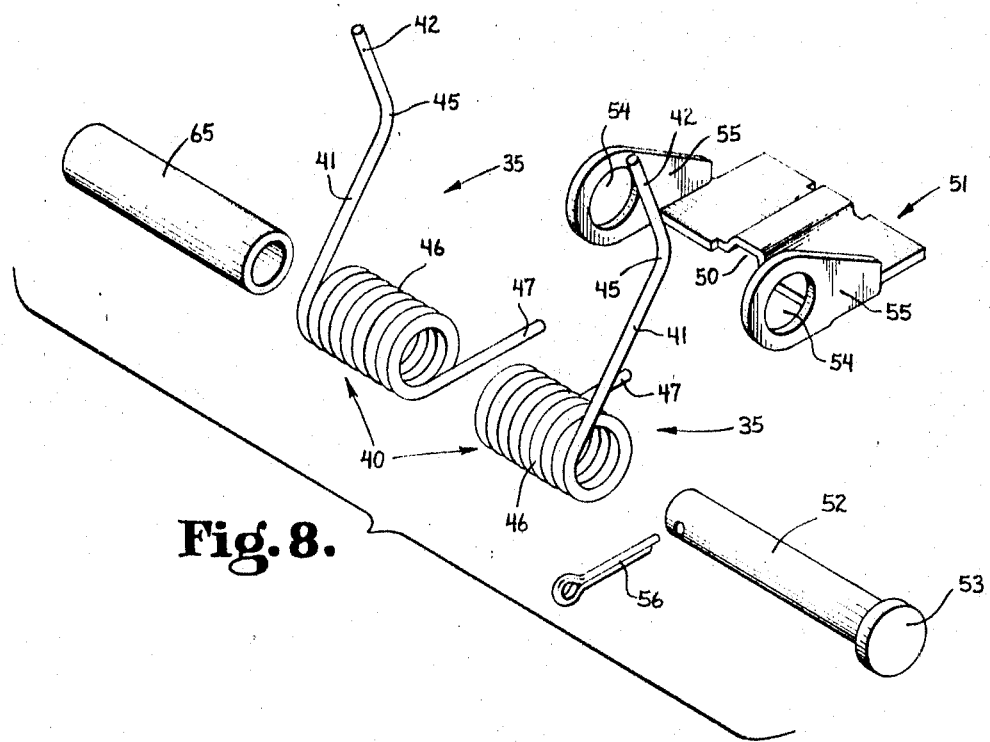
FIG. 8 is an enlarged exploded perspective view of a representative pair of spring tines of the embodiment of FIGS. 1–3 and 7.
Figure 9:
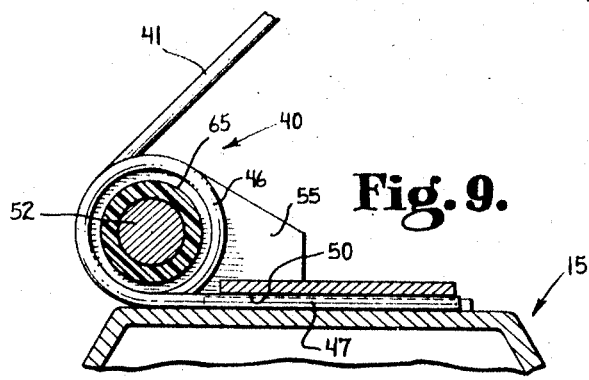
FIG. 9 is an enlarged fragmentary section taken along the line 9—9 of FIG. 3 in the direction of the arrows.

The spring tines 35 are mounted on the tube 15 on the surfaces 36 of the tube which are between the mounting locations of the blades 30. That is, the blades are mounted on a spaced three of the six surfaces 36 of the tube 15 while the spring tines 35 are mounted on the other three of the six surfaces. A single wire 40 is used to form each of the spring tines 35. The single wire is bent into the configuration illustrated in FIGS. 2, 8 and 9 which includes a proximal portion 41 with a length A and a distal portion 42 with a length B arranged at an angle to the proximal portion 41. In the specific embodiment of FIG. 2 the distal portion 42 is connected to the proximal portion 41 by a curved portion 45 extending through an angle of 60 degrees and having a radius of .5 inch. In said specific embodiment the distance A is .94 inch and the distance B is .31 inch. Also the angle C between the proximal portion 41 and the surface 36 upon which the spring tine is mounted is 45 degrees. Each of the wires 40 further includes a coiled portion 46 connected to the proximal portion 41 and a tangentially extending anchor portion 47 which extends into a recess 50 in a spring tine mounting element 51. Each of the proximal portions 41 also extends tangentially of its respective coiled portion 46 as best shown in FIGS. 2 and 9. Each of the spring tine mounting elements 51 together with a shaft 52 mounts two of the spring tines 35, said two spring tines being the mirror images of one another and each having a tangentially projecting portion 47 extending into the common recess 50 of the single spring tine element 51.

Each shaft 52 has a head 53 on one end and is retained within suitable apertures 54 in the arms 55 of element 51 by a cotter pin 56 at the opposite end of the shaft. Each of the spring tine mounting elements 51 is welded at 60 to one of the hexagonal surfaces 36 to mount the spring tines on the tube. As an alternative, the spring tine mounting elements can be secured by screws 54 (see FIGS. 2 and 3) in lieu of welding. It can be appreciated that in the event that one of the spring tines strikes a rock or other object the coil springs 46 can resiliently yield to permit the tine to pass over and around the object without damage to the present apparatus. There are four such tines provided for each of the blades 30 with each of the blades and tines 35 being so located on the hexagonal surfaces that the paths of the blades and tines are equally spaced in the manner shown in the lower portion of FIG. 3. As is best shown in FIGS. 8 and 9, each of the pins 52 is provided with a nylon sleeve 65 upon which the coil 46 is received. The inside diameter of the coils 46 is sufficiently greater than the outside diameter of the sleeve 65 to provide clearance for the tightening of the coils. In one specific embodiment of the invention the outside diameter of the pin 52 is one-fourth inch, the outside diameter of the sleeve 65 is three-eighths inch (.375 inch) while the I.D. thereof is one-fourth inch and the inside diameter of the coil 46 is .45 inch thus leaving a difference in diameters of .45 minus .375 or .075 inch or 3/40 of an inch for the coil to flex. The nylon sleeve functions to provide a lubricating action as the coils flex reducing fatigue in the coils and permitting deformation throughout all the coils thus increasing the life of the coils and the pins 52. By the use of the nylon sleeve, the necessity of replacing the pins 52 at frequent intervals is reduced or eliminated. It should be mentioned that the nylon sleeves also extend through the apertures 54 in the mounting element 51.

Referring to FIG. 3, D and E represent respectively the radial distance between the turf engaging surfaces of the wheels 25 and the tip paths of blades 30 and the radial distance between the turf engaging surfaces of the wheels and the tip paths of the spring tines 35. In one specific embodiment of the invention the distance D is 1½ inches while distance E is 1 inch. As suggested hereinabove, the distances D and E may be adjusted by suitable means according to the thickness of the turf upon which the present apparatus is being used. Of course, the difference between distances D and E remains constant throughout such adjustment and is, in the present specific embodiment, ½ inch.

An alternative embodiment of the present invention is shown in FIGS. 4, 5 and 6. This alternative embodiment can operate in similar fashion to the embodiment of FIGS. 1–3, that is, with blades mounted on three of the six hexagonal surfaces and with spring tines mounted on the other three of the six hexagonal surfaces. The embodiment of FIGS. 4, 5 and 6 can also be used to mount spring tines on all of the six hexagonal surfaces or to mount blades 30 on all of the six hexagonal surfaces. Furthermore, the spring tines of FIG. 4, 5 and 6 can be used in place of the blades shown in FIGS. 2 and 3 to convert the apparatus of FIGS. 2 and 3 so that it incorporates no blades and all spring tines.

Referring more particularly to FIGS. 4, 5 and 6, there is illustrated a single wire 100 used to form a pair of spring tines 101 and 102. The wire 100 includes distal portions 105 and 106 and proximal portions 107 and 108 all arranged at generally the same angles as the above described spring tine arrangement. The wire 100 includes a coiled portion 110 which connects the spring tines 101 and 102 and which is interrupted centrally with a tangentially extending loop 111. The wire 100 is mounted on the tube 115 by means of spring tine mounting element 116 which is composed of nylon or similar plastic and includes a pair of oppositely projecting shafts 117 adapted to receive the coiled portion 110 of the wire 100 with the coiled portion 110 inboard of the heads 120 of shafts 117. Because of the rounded off nature of the heads 120 and the fact that they are made of nylon, the coiled portions 110 can be easily snapped over heads 120 onto shafts 117.

Each spring tine mounting element 116 has an aperture 125 therethrough which is countersunk to receive a screw 126 for mounting the element 116 on the tube 115. The tube 115 is provided with a Riv-Nut 124 for receiving the screw 126 although in some situations a conventional nut might be used for this purpose. Each of the elements 116 has a protuberance 127 which extends into a smaller aperture 130 through the tube 115. Each aperture 130 is spaced from a larger aperture 131 through the tube 115, said apertures 130 and 131 being spaced equally to the spacing of the aperture 125 and protuberance 127. When each of the elements 116 is mounted on the tube 115 by means of the bolt 126, the surface 132 of the element 116 holds the loop 111 tightly against the surface of the tube thus providing a firm mounting for the spring tines 101 and 102.

Referring more particularly to FIG. 7, the blades 30 are mounted on the tube 15 and on the tube 115 in exactly the same manner in which the elements 116 are mounted thereon. That is, each of the blades 30 has a protuberance 140 similar to the protuberance 127 and an aperture 141 similar to the aperture 125 and spaced from the respective protuberance the same distance as the spacing of the aperture 125 from the protuberance 127. The bolts 150 and Riv Nuts 151 are identical to the bolts 126 and Riv Nuts 124 thus making interchangeable the spring tine mounting elements 116 and blades 30. It will be noted that the protuberance 140 is defined by a suitable rivet.

It will be evident from the above description that the present invention provides an improved lawn care apparatus which is useable to remove dead grass blades, clippings and other organic debris from a lawn area without noticeable damage to established grasses. Preferably the present device is used in connection with a conventional catcher (not shown) which is attached to the back of the frame 12 to receive the grass clippings and thatch in conventional manner. Alternatively, the present device can be used without a catcher in which case it merely acts to slice and lift debris above grass level. It will also be evident that the present invention provides lawn care apparatus capable of making grooves or slices to provide a lodging place for seed. It should be mentioned that the present apparatus can be operated to rotate the tube 15 in either direction. (The arrow 200 in FIG. 2, of course, shows the direction of rotation of the embodiment illustrated in FIG. 2.) Assuming, for example, that the tube 15 of FIG. 1 is reversed end for end, the tube would be rotated in the opposite direction. In the event that a catcher is used, however, the tube should rotate in such a direction that the thatch, debris etc. is thrown up and over the tube prior to entering the catcher.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. Lawn care apparatus comprising a tube having an axis, means for mounting said tube for rotation about its axis with its axis in parallel relation to the ground, power means for rotating said tube in a direction of rotation, a plurality of blades each having a vertically extending cutting portion and each mounted on said support element, a plurality of wires each formed into a spring tine connected to one end of a coil of wire from the other end of which extends a wire projecting portion, a spring tine mounting element for each pair of said plurality of wires, each of said mounting elements being secured to said tube, a plurality of shafts each extending parallel to said axis and secured to a respective mounting element, the coils of respective pairs of said wires being coiled about a common respective shaft of said shafts, said tines projecting tangentially from said coiled wire and having distal ends which curve toward said direction of rotation, said blades projecting radially outwardly from said axis a greater distance than said tines, the projecting portions of each pair of said wires being retained beneath a common respective spring time mounting element to hold said tines in projecting position, each of said tines being resiliently yieldable in a direction opposite to said direction of rotation by the flexing of the respective coiled portions of wire about the respective shafts.

2. Lawn care apparatus comprising a tube having an axis and being of hexagonal external cross section, means for mounting said tube for rotation about its axis with its axis in parallel relation to the ground, power means for rotating said tube in a direction of rotation, a plurality of wires each formed into a pair of spring tines connected by coiled wire with an intermediate wire projecting portion, a spring tine mounting element for each wire of said plurality of wires, each of said mounting elements being secured to said tube and having shaft means extending parallel to said axis, said coiled wire being coiled about said shaft means, said tines projecting tangentially from said coiled wire and having distal ends which curve toward said direction of rotation, the intermediate wire projecting portion of each of said wires being retained beneath a respective spring tine mounting element to hold said tines in projecting position, each of said tines being resiliently yieldable in a direction opposite to said direction of rotation by the flexing of the respective coiled portions of wire about the respective shaft means.

3. Lawn care apparatus comprising a tube having an axis and being of hexagonal external cross section, means for mounting said tube for rotation about its axis with its axis in parallel relation to the ground, power means for rotating said tube in a direction of rotation, a plurality of blades each having a vertically extending cutting portion and a horizontally extending flange mounting the respective blade on said tube, each of said blades extending in a plane perpendicular to the axis of said tube, a plurality of wires each formed in a pair of spring tines connnected by coiled wire with an intermediate wire projecting portion, a spring tine mounting element for each wire of said plurality of wires, each of said mounting elements being secured to said tube and having shaft means extending parallel to said axis, said coiled wire being coiled about said shaft means, said tines projecting tangentially from said coiled wire and having distal ends which curve toward said direction of rotation, said blades projecting radially outwardly from said axis a greater distance than said tines, the intermediate wire projecting portion of each of said wires being retained beneath a respective spring tine mounting element to hold said tines in projecting position, each of said tines being resiliently yieldable in a direction opposite to said direction rotation by the flexing of the respective coiled portions of wire about the respective shaft means.

4. The lawn care apparatus of claim 3 wherein each of said spring tine mounting elements have an aperature therethrough and a protuberance thereon, said tube having a plurality of pairs of aperatures with the apertures of each pair spaced equally to the spacing of each mounting element aperture and protuberance, each of said protuberances being received in one of the apertures of some of said pairs of apertures, a plurality of screws received in the other apertures of said some pairs of apertures and extending through respective apertures of said spring tine mounting elements to mount said elements on said tube, each flange of said blades having an aperture therethrough and a protuberance spaced equally to the apertures of each pair of apertures, each of said flange protuberances being received in one of the apertures of the others of said pairs of apertures, a further plurality of screws received in the other apertures of said others of said pairs of apertures and extending through respective apertures of said flanges to mount said blades on said tube.

5. Lawn care apparatus comprising: a carriage; rotary means supporting said carriage and adapted to engage the lawn for movement of said carriage across the lawn, the lawn support engagement of said rotary means defining a plane; a support element having an axis, means for mounting said support element on said carriage for rotation about its axis with its axis in parallel relation to the lawn; power means for rotating said support element in a direction of rotation; a plurality of rigid blades each mounted on said support element; a plurality of raking spring tines mounted on said support element, said tines being capable of flexing when obstacles are struck during rotation; said spring tines extending generally radially of said axis with both said blades and said spring tines extending beyond said plane; and at least during operating conditions of said apparatus said blades extending a greater distance beyond said plane than do said spring tines; said spring tines being mounted on said support element at more closely spaced intervals than said blades.

6. In a lawn care apparatus as defined in claim 5, said support element being hollow and having a cross section of polygonal shape providing a plurality of flat elongate platforms extending parallel to the axis of said member, said blades and tines being disposed at spaced intervals on the platforms of said support element.

7. In a lawn care device: an elongated member rotatable on an axis extending lengthwise thereof; a plurality of ground scarifying blades; means securing said blades to and projecting from said member at spaced intervals; a plurality of raking spring tines; means securing said tines to and projecting from said member at spaced intervals; said member being hollow and having a cross section of polygonal shape providing a plurality of flat elongate platforms extending parallel to the axis of said member, said securing means disposing said blades and said tines at spaced intervals on said platforms, said tines being disposed in pairs, each tine including a multiple coil mounting portion with a projecting anchor leg; a common mounting bracket for each pair of tines including a portion engaging and clamping the anchor leg of each tine against an adjacent portion of a one of said flat platforms; and a tine mounting elongate means in said bracket disposed within said coils and having a diameter sufficiently smaller than said coils to provide clearance for tightening of said coils.

8. In a lawn care device: an elongated member rotatable on an axis extending lengthwise thereof; a plurality of ground scarifying blades; means securing said blades to and projecting from said member at spaced intervals; a plurality of raking spring tines; means securing said tines to and projecting from said member at spaced intervals; said member being hollow and having a cross section of polygonal shape providing a plurality of flat elongate platforms extending parallel to the axis of said member, said securing means disposing said blades and said tines at spaced intervals on said platforms, said tines being disposed in pairs, each tine including a multiple coil mounting portion with a projecting anchor leg; a common mounting bracket for each pair of tines including a portion engaging and clamping the anchor leg of each tine against an adjacent portion of a one of said flat platforms; and a tine mounting elongate means to said bracket disposed within said coils.

9. In a lawn care device as defined in claim 7, said tine mounting elongate means including means providing a tough plastic surface having an effective self-lubricating characteristic coaxially within said coils and adapted to be engaged by said coils, particularly during raking operations.

10. In a lawn care device as defined in claim 9, said elongate means comprising an elongate pin extending through the two coil mounting portions of a pair of tines and means removably securing said pins in the associated bracket with the axis of said pin spaced radially outward from the associated flat platform and parallel to the axis of said member, and a high polymer plastic sleeve bearing on said pin within said coil mounting portions providing said plastic surface.

11. In a lawn care device as defined in claim 9, said elongate means comprising nylon pins on said bracket.

12. A polygonal lawn care device rotor comprising a tube adapted to be rotated around its tubular axis with such axis substantially parallel to the ground; a plurality of scarifying ground cutting blades secured on the outside of said tube at intervals along said tube as well as angularly around the axis of said tube; a plurality of spring coil mounted raking tines greater in number than the number of said blades; said tines also being secured on the outside of said tube at intervals along said tube as well as angularly around said tube; said blades being rigid; said tines being rendered capable of flexing when obstacles are struck during rotation, and means securing said tines to said tube, providing internal support to said coils, enabling clearance for unimpeded tightening of said coils when said tines are flexed, and serving as a wear resistant bearing means during such flexing.

13. A polygonal lawn care device rotor comprising a tube adapted to be rotated around its tubular axis with such axis substantially parallel to the ground; a plurality of scarifying ground cutting blades secured on the outside of said tube at intervals along said tube as well as angularly around the axis of said tube; a plurality of spring coil mounted raking tines greater in number than the number of said blades; said tines also being secured on the outside of said tube at intervals along said tube as well as angularly around said tube; said blades being rigid; said tines being rendered capable of flexing when obstacles are struck during rotation, said blades terminating at a distance radially outward from the axis of said tube which is slightly greater than the distance from the axis of said tube at which said tines terminate.

14. A lawn care device spring tine arrangement comprising a pair of raking tines; a multiple coil mounting portion with a projetcing anchor leg for each of said tines; a common mounting bracket for said pair of tines including a portion adapted to engage and clamp the anchor leg of each tine against a support platform; and a tine mounting elongate means in said bracket disposed within said coils, said elongate means having a diameter sufficiently smaller than said coils to provide clearance for the tightening of said coils, said mounting elongate means providing a tough plastic surface having an effective self-lubricating characteristic coaxially within said coils and adapted to be engaged by said coils, particularly during raking operations.

15. A lawn care device spring tine arrangement comprising a pair of raking tines; a multiple coil mounting portion with a projecting anchor leg for each of said tines; a common mounting bracket for said pair of tines including a portion adapted to engage and clamp the anchor leg of each tine against a support platform; and a tine mounting elongate means in said bracket disposed within said coils, said elongate means comprising an elongate pin extending through the two coil mounting portions of said pair of tines and means removably securing said pin in said bracket, and a plastic sleeve bearing on said pin within said coil mounting portions providing a self-lubricating characteristic and adapted to be engaged by said coil mounting portions, particularly during raking operations.

16. A lawn care device spring tine arrangement comprising a pair of raking tines; a multiple coil mounting portion including two groups of coils with an intermediate projectin anchor loop; said tines extending from the opposite ends of said coil mounting portion; a common mounting bracket for said pair of tines including a portion adapted to engage and clamp the anchor loop of said tines against a support platform; and a pair of oppositely extending projections receiving and mounting the respective groups of coils, said oppositely extending projections being secured to said bracket and being so formed as to have said respective groups of coils slipped over them.

17. A lawn care device spring tine arrangement as defined in claim 16 wherein said bracket and projections are integral and formed of a tough plastic having an effective self-lubricating characteristic.

18. A lawn care device spring tine arrangement comprising a pair of raking tines; a multiple coil mounting portion with an intermediate projecting anchor loop; said tines extending from the opposite ends of said coil mounting portion; a common mounting bracket for said pair of tines including a portion adapted to engage and clamp the anchor loop of said tines against a support platform; and a pair of oppositely extending projections receiving and mounting said coil mounting portion, said bracket having an aperture therethrough for receiving a screw to mount said bracket on a support platform, said bracket further including a flat surface through which said aperture opens, and a protuberance projecting from said flat surface and adapted to be received in an aperture in a support platform when said bracket is mounted thereon.

References Cited

UNITED STATES PATENTS

| | | | |
|---|---|---|---|
| 2,328,121 | 8/1943 | Bartek | 56—400 |
| 2,607,182 | 8/1952 | Hill | 56—400 |
| 2,902,098 | 9/1959 | Grunder | 172—96 |
| 2,987,866 | 6/1961 | Ferris | 56—27 |
| 3,014,335 | 12/1961 | Nolt | 56—400 |
| 3,125,844 | 3/1964 | Beyer | 56—400 X |
| 3,199,278 | 8/1965 | Dye | 56—27 |

FOREIGN PATENTS

| | | |
|---|---|---|
| 213,384 | 2/1958 | Australia. |
| 584,258 | 9/1933 | Germany. |

ABRAHAM G. STONE, Primary Examiner

STEPHEN C. PELLEGRINO, Assistant Examiner

U.S. Cl. X.R.

56—27; 172—96